No. 633,829. Patented Sept. 26, 1899.
J. GALLEGOS.
STATIC ELECTRIC MACHINE.
(Application filed June 19, 1899.)
(No Model.) 2 Sheets—Sheet 1.
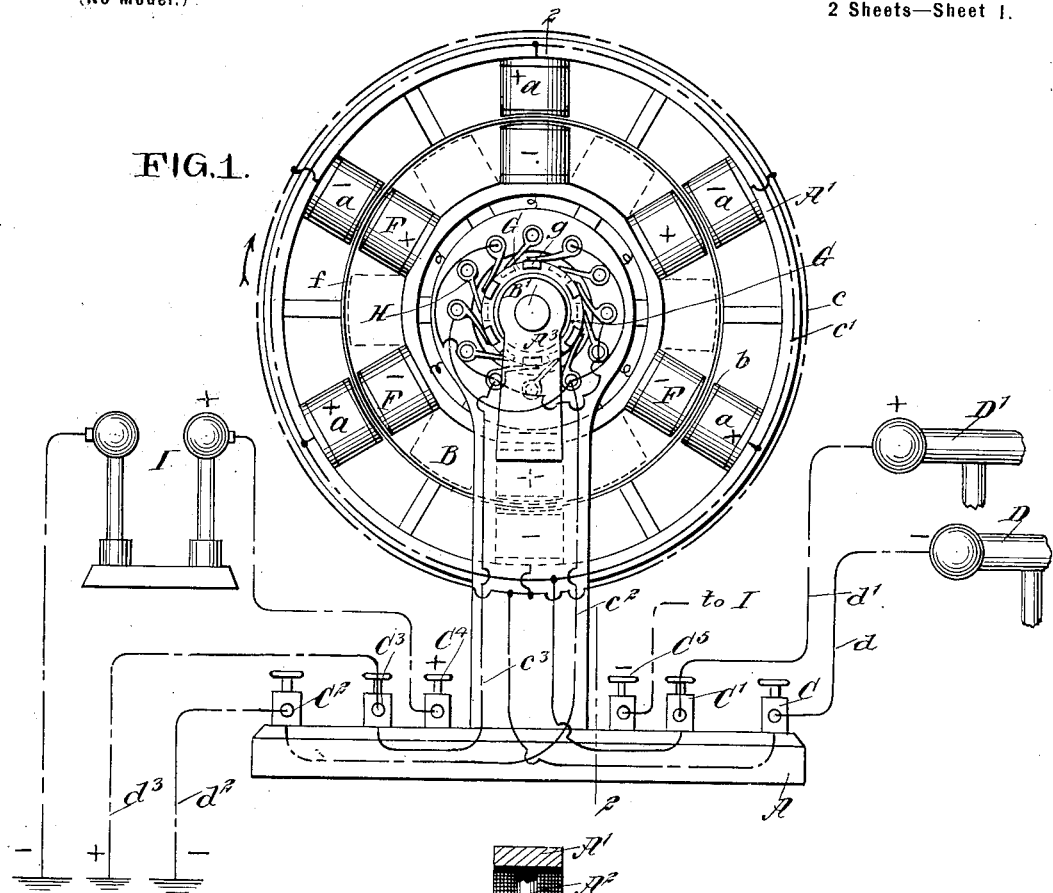
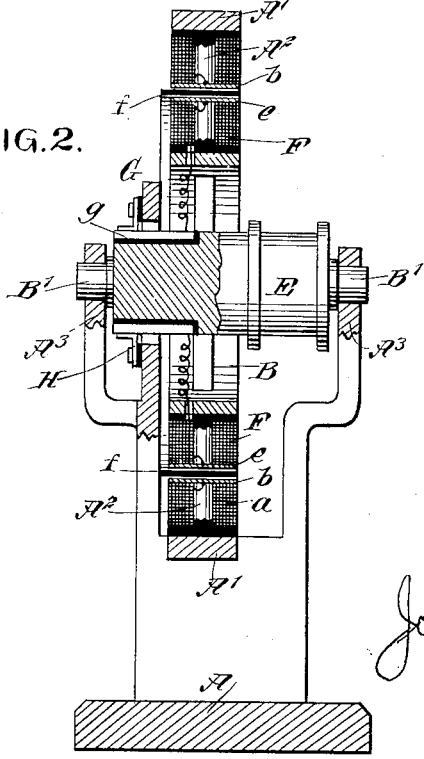
WITNESSES:
Donn Twitchell
John Lotka
INVENTOR
Jose Gallegos
BY
Munn
ATTORNEYS.
THE NORRIS PETERS CO., PHOTO-LITHO., WASHINGTON, D. C.

No. 633,829. Patented Sept. 26, 1899.
J. GALLEGOS.
STATIC ELECTRIC MACHINE.
(Application filed June 19, 1899.)

(No Model.) 2 Sheets—Sheet 2.

WITNESSES:
Donn Twitchell
John Lotko

INVENTOR
Jose Gallegos
BY
Munn
ATTORNEYS

THE NORRIS PETERS CO., PHOTO-LITHO., WASHINGTON, D. C.

UNITED STATES PATENT OFFICE.

JOSÉ GALLEGOS, OF SAN JOSÉ DE GUATEMALA, GUATEMALA.

STATIC ELECTRIC MACHINE.

SPECIFICATION forming part of Letters Patent No. 633,829, dated September 26, 1899.

Application filed June 19, 1899. Serial No. 721,060. (No model.)

*To all whom it may concern:*

Be it known that I, JOSÉ GALLEGOS, a citizen of the Republic of Guatemala, and a resident of San José de Guatemala, in the Republic of Guatemala, have invented new and useful Improvements in Static Electric Machines, of which the following is a full, clear, and exact description.

My invention relates to static electric machines of the class known as "influence" or "induction" machines, and has for its object to provide a very efficient machine of the above-indicated class.

To this end my invention consists of certain novel features of construction and combinations of parts, as will be fully described hereinafter and specifically pointed out in the appended claims.

Reference is to be had to the accompanying drawings, forming a part of this specification, in which similar characters of reference indicate corresponding parts in all the figures.

Figure 3:
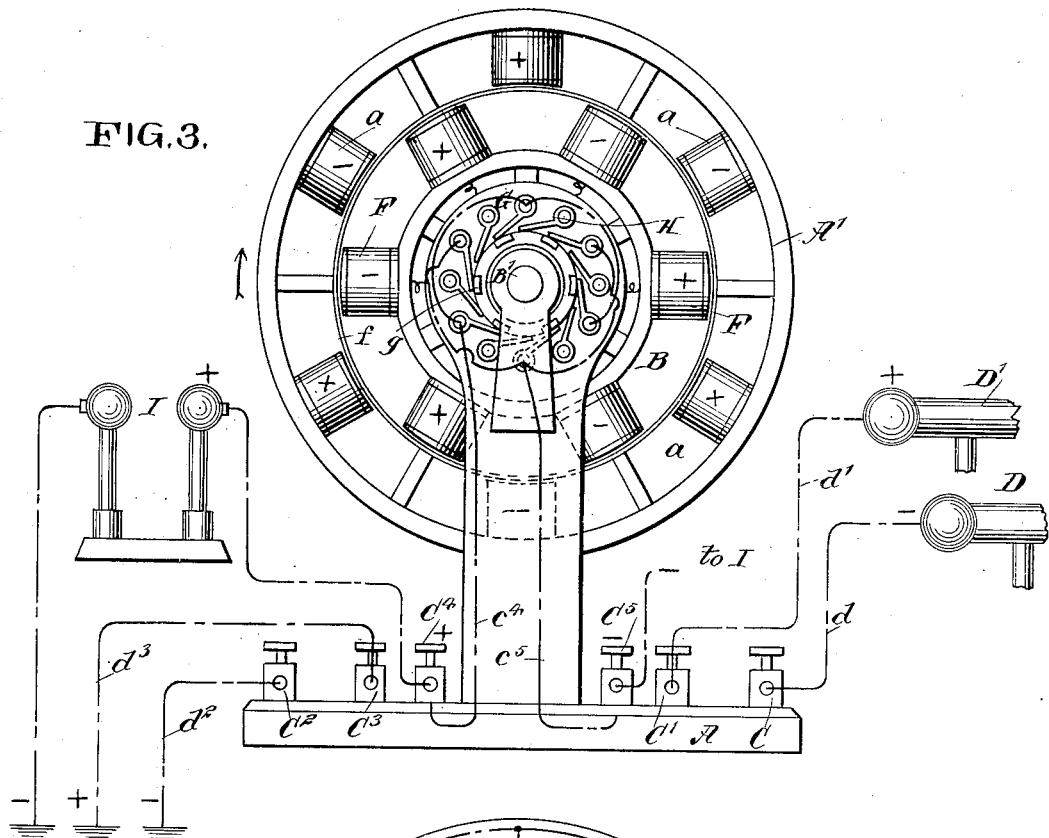
Figure 4:
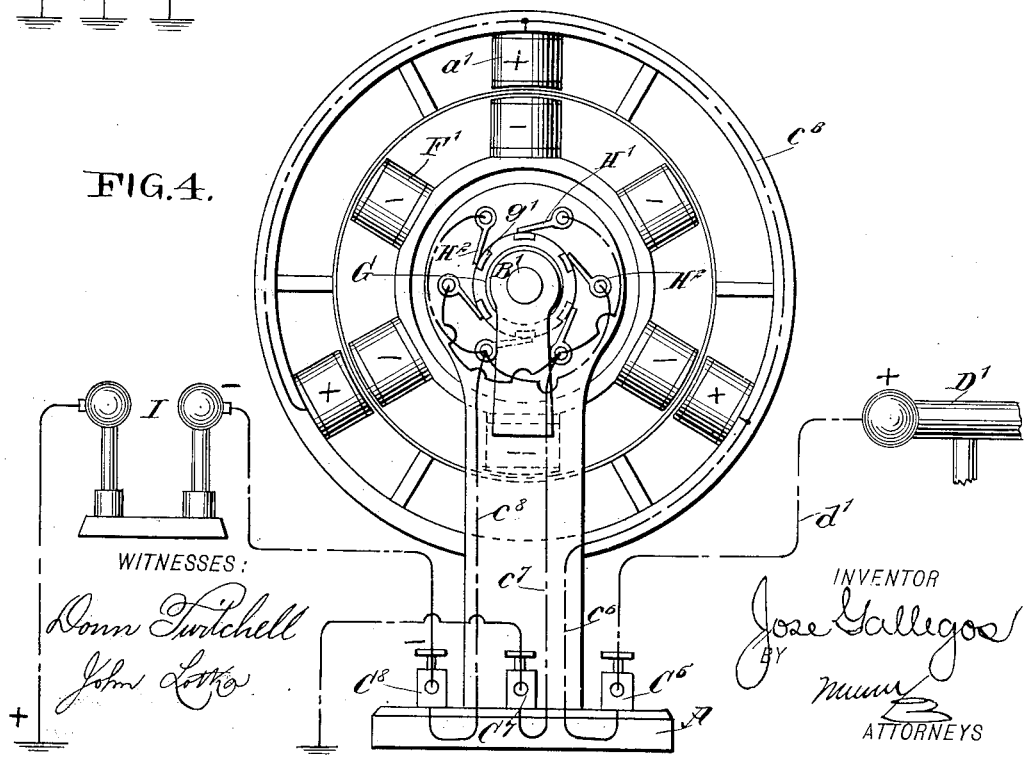

Figure 1 is a front elevation of the improved machine. Fig. 2 is an end elevation thereof, with parts in section, on the line 2 2 in Fig. 1. Fig. 3 is a view similar to Fig. 1, but with the parts in a different position and showing those electrical connections which for the sake of clearness are omitted from Fig. 1; and Fig. 4 shows a simplified form of construction.

Upon the base A is fixed a stationary ring A', preferably made of wood and having inward radial projections $A^2$, (likewise of wood,) upon which are wound coils of insulated wire $a$, one end of each coil being connected with a metal plate $b$ at the inner end of the projection, while the outer ends of the coils are connected alternately by wires $c$ and $c'$, respectively, with binding-posts C C'. These posts are adapted for connection by wires $d$ $d'$ with a source of static electricity—for instance, as shown, the collectors D D' of a friction electric machine. The stationary parts so far described constitute what may be termed the "exciting elements" of the machine.

The excited or delivering part of the machine comprises the following movable elements: A wheel B is journaled by trunnions B' in bearings $A^3$ of the base A and carries a pulley E, by which power may be applied to turn the wheel, generating-coils F, and a collector G. The coils F are constructed similarly to the coils $a$ and correspond to them in number and position. The outer ends of the coils F are connected with metal plates $e$, adapted to pass close to the metal plates $b$, the two sets of plates being insulated from each other simply by the intervening air or by a cylindrical sheet $f$, of insulating material, such as glass, carried by the wheel B or by the stationary base, preferably the latter. The inner ends of the coils F are connected with contact-plates $g$ on the collector G. These contact-plates are adapted to be engaged by stationary collecting-brushes H, the number of which is double that of the contact-plates, some of the brushes being arranged to engage the contact-plates when the coils $a$ and F register, as shown in Fig. 1, while the other brushes engage the contact-plates when they are in the intermediate position. (Shown by dotted lines in Fig. 1 and better represented in Fig. 3.) Of those brushes which engage the contact-plates in the position shown in the drawings alternate ones are connected by wires $c^2$ and $c^3$, respectively, with binding-posts $C^2$ $C^3$; connected to the ground by wires $d^2$ $d^3$. Of the intermediate collecting-brushes alternate ones are connected by wires $c^4$ and $c^5$, respectively, with the binding-posts $C^4$ and $C^5$, from which connection is made to any apparatus—(for instance, a spark-discharger I)—in which the electricity produced is to be utilized.

The machine is operated simply by rotating the wheel B after giving the coils $a$ an initial charge of electricity by connecting the binding-posts C C' with a source of static electricity, as shown. The coils F being conected to the ground when they stand opposite the coils $a$ will by influence receive a charge of opposite polarity, as indicated in Fig. 1, and when the coils F get into the intermediate position (shown in dotted lines) they will be in connection with the binding-posts $C^4$ $C^5$ and will discharge their electricity into the consumption apparatus I. It will be seen that the machine produces both positive and negative electricity and that by reversing the wheel B the binding-posts $C^4 C^5$ may be caused to receive the charge of either positive or negative electricity. The parts $a$ and F are formed into coils to secure considerable capacity with a relatively small bulk.

It will be obvious that the machine is a double one and receives and yields both positive and negative electricity. Further, it will be evident that the machine consists virtually of two independent halves and that by leaving one-half out of action the machine may be operated to receive positive electricity only and deliver only negative electricity, or vice versa. Of course I might, as shown in Fig. 4, construct a machine embodying only one of the halves—that is, having a series of stationary coils $a^4$, all connected by a wire $c^6$ with the same binding-post $C^6$, a series of movable coils F′, all connected to the ground through their contact-plates $g'$, brushes H′, wire $c^7$, and binding-post $C^7$ when they stand opposite the stationary coils, and other brushes H², wire $c^8$, and binding-post $C^8$ for taking the charge off the coils F when they stand in their intermediate position. It will be seen that in each construction the number of collecting-brushes is double that of the stationary coils. It would be an obvious equivalent to have the brushes revolve and make the contact-plates stationary. Of course the machine is reversible and may be used as a motor, if desired. Further, it will be understood that a connection to the opposite pole of the exciting-machine is the equivalent of a ground connection.

Wires $d$ $d'$ may also be connected with a source of dynamic electricity, like voltaic one, with which electricity-condensers may be charged. The coils, if desired, may be omitted, leaving only the metal plates to form the condensers. The coils may have an iron core for obtaining a stronger induction-current.

Having thus described my invention, I claim as new and desire to secure by Letters Patent—

1. A static-induction machine, comprising a series of stationary coils and means for connecting them with a supply of static electricity, movable coils arranged to pass adjacent to the stationary coils, and collecting devices for connecting the movable coils with the ground when they register with the stationary coils, and for connecting the movable coils with a consumption apparatus when they are in a position between the stationary coils.

2. A static-induction machine, comprising a series of stationary coils and means for connecting them with a supply of static electricity, a wheel carrying a series of movable coils arranged to pass adjacent to the stationary coils, and collecting devices, the number of which is double that of the stationary coils, one half of said collecting devices being constructed to connect the movable coils with the ground when they register with the stationary coils, and the other collecting devices being arranged to connect the movable coils with a consumption apparatus when they are in an intermediate position.

3. A static-induction machine, comprising a series of stationary coils and means for connecting them with a supply of static electricity, a wheel carrying a series of movable coils arranged to pass adjacent to the stationary coils, the coils at their opposing ends carrying metal plates, and collecting devices, the number of which is double that of the stationary coils, one half of said collecting devices being constructed to connect the movable coils with the ground when they register with the stationary coils, and the other collecting devices being arranged to connect the movable coils with a consumption apparatus when they are in an intermediate position.

4. A static-induction machine, comprising a series of stationary coils and means for connecting them with a supply of static electricity, a wheel carrying a series of movable coils arranged to pass adjacent to the stationary coils, the coils at their opposing ends carrying metal plates separated by an insulating-cylinder, and collecting devices, the number of which is double that of the stationary coils, one half of said collecting devices being constructed to connect the movable coils with the ground when they register with the stationary coils, and the other collecting devices being arranged to connect the movable coils with a consumption apparatus when they are in an intermediate position.

5. A static-induction machine, comprising a series of stationary coils alternate ones of which are connected electrically so that the coils are capable of receiving static charges of opposite polarity, movable coils arranged to pass adjacent to the stationary coils and each connected with a contact-plate, and a multiple set of collecting devices, arranged to connect the contact-plates with the ground when the movable coils connected therewith stand opposite the stationary coils, and to connect the contact-plates, according to their different polarity, with a consumption apparatus when they stand in an intermediate position.

JOSÉ GALLEGOS.

Witnesses:
JOSÉ ANTONIO PEÑE,
RAMÓN SALAZAR.